March 25, 1958          A. B. HURLEY          2,827,955

FOLDING MOTION PICTURE PROJECTION SCREEN

Filed March 29, 1956          5 Sheets-Sheet 1

INVENTOR.
ALBERT B. HURLEY
BY
ATTORNEY

March 25, 1958     A. B. HURLEY     2,827,955

FOLDING MOTION PICTURE PROJECTION SCREEN

Filed March 29, 1956     5 Sheets-Sheet 2

INVENTOR.
ALBERT B. HURLEY
BY
*James and Franklin*
ATTORNEY

INVENTOR.
ALBERT B. HURLEY

INVENTOR.
ALBERT B. HURLEY
BY
ATTORNEY

March 25, 1958 A. B. HURLEY 2,827,955
FOLDING MOTION PICTURE PROJECTION SCREEN
Filed March 29, 1956 5 Sheets-Sheet 5

INVENTOR.
ALBERT B. HURLEY
BY
James and Franklin
ATTORNEY

United States Patent Office 2,827,955
Patented Mar. 25, 1958

2,827,955

FOLDING MOTION PICTURE PROJECTION SCREEN

Albert B. Hurley, Huntington, N. Y.

Application March 29, 1956, Serial No. 574,736

10 Claims. (Cl. 160—24)

The present invention relates to a motion picture projection screen which can be extended to operative position and which is adapted, when not in use, to be folded so as to occupy a small space.

The usual type of portable projection screen comprises a flexible reflective sheet rolled up within a housing on a spring roller and adapted to be unrolled from that housing to extended position. This type of structure is practical for small screens of conventional type, and even there is subject to significant disadvantages when silver coated surfaces are employed, even with a screen of conventional size and shape. Silver coated surfaces, in contradistinction to white or beaded surfaces, are extremely sensitive, and any slight mark or crease deforms the surface and is quite visible when an image is projected thereon. They are not only susceptible to damage by abrasion, scratches or the like, but also are very readily marked by the rollers which must be provided in structures of the type under discussion in order to guide the screen as it moves between its wound and unwound positions. Either these disadvantages are tolerated or special provision must be made to minimize or overcome them.

Conventional types of motion pictures have an aspect ratio of 1.33 to 1. That is to say, the width of the picture is 1.33 times its height. New methods of photography, so-called "wide screen" techniques, have resulted in the use of a much greater aspect ratio, to wit, 2.55 to 1. Hence the width of screens suitable for the projection of such pictures has greatly increased. To use a screen of conventional width for the projection of "wide screen" pictures means that the height of those pictures must be greatly curtailed, with a resultant lack of effectiveness in projection. To maintain the height of the pictures at substantially normal level means that the screen must be almost twice as wide as has previously been the case. In such a situation conventional rolled screens are essentially unsatisfactory, even when used for home use, because of the great width involved. Such screens would be unwielding and could not readily be stored or transported. When projection for a fairly large number of persons is required, as when a movie is to be shown at a club or a dinner, the situation is greatly aggravated because of the increased size involved. Such screens, when extended, may be as much as ten feet in width.

Nor may such a screen, even when provided with a white or beaded surface, be folded in conventional manner in order to reduce its width when stored or transported. Even white or beaded surfaces are damaged if they are sharply bent or folded.

Another factor which makes the use of conventional rolled screens, no matter what the type of surface, essentially unsuited for "wide screen" projection is the fact that with such wide screens it is most desirable that the screens be curved, the radius of curvature being substantially equal to the distance from the screen to the projector. Because of the wide aspect ratio of such pictures, it is difficult if not impossible to have the ends of the picture and the center of the picture appear in approximately equal brightness unless this is done.

The structure of the present invention is specially designed to solve the problems set forth above. The screen proper is, as is customary, in the form of a flexible sheet of appropriate material having a reflective surface of any desired type. It is mounted in a framework which can be extended to display position and which can be folded to take up a comparatively small amount of space, thus facilitating storage and transportation. The framework is so designed, and the screen is so mounted thereon, that when the framework is folded to storage position the reflective sheet is protected and, which is most important, is always bent with a comparatively large radius of curvature despite the fact that the framework folds may be quite extreme. Hence the reflective surface will not become marred or distorted no matter for how long a period of time it may be kept in its folded condition. In addition, the framework, when unfolded, is specially designed so as to maintain the reflective sheet substantially tautly in a curved condition.

To these ends the framework comprises a comparatively narrow primary frame section to each of the sides of which secondary frame sections are articulately connected. Each of the frame sections is provided with top and bottom rails, and the flexible reflective sheet is mounted between and secured to those rails. The secondary frame sections are movable between positions substantially in line with the primary frame section and positions substantially at right angles thereto, those positions corresponding respectively to the unfolded and folded conditions of the screen respectively. Means are provided for retaining the frame sections in both of the above specified relative positions. The reflective sheet is secured to the top and bottom rails of the appropriate frame sections along the lengths thereof, but that securement terminates at points appreciably spaced from the sides of those sections. Consequently, when the sections are folded the flexible sheet will, at the corners of the fold, be permitted to assume a very gentle and gradual curvature.

When, as is here specifically disclosed, the frame sections when unfolded are not directly in line with one another but instead make comparatively large obtuse angles with one another, the reflective sheet, because of the manner in which it is mounted on the rails of the frame sections, will assume a gentle and uniformly curved condition well suited for "wide screen" projection. In order to facilitate the assumption by the flexible sheet of such a uniformly curved condition, the top and bottom edges of the sheet are secured to the frame section rails indirectly by means of a plurality of flexible strips spaced along the length thereof. Thus, even though the frame sections themselves may be straight or substantially so, the flexible strips will translate the angular configuration of the frame sections when unfolded into a smoothly curved configuration of the flexible reflective sheet.

In order to cause the screen to take up a minimum amount of space when folded, the secondary frame sections are adapted to extend alongside one another in that folded condition. As a result, in many cases the very same structure which is operative between adjacent sections when the screen is unfolded in order to retain those sections in that position can also be used to retain the frame sections in folded position.

Legs may be provided in order to support the screen when it has been unfolded. In one embodiment here disclosed these legs are telescopable relative to structural portions of selected frame sections, and when the legs are moved to operative position the weight of the frame itself serves to retain those legs in operative screen-supporting position.

In order to cause the screen, when folded, to take up a truly minimal amount of space, the secondary frame sections on each side of the primary frame section may be formed in sets of articulately connected sections. As here specifically disclosed each set may consist of two secondary frame sections. The secondary frame sections of each set are, when the screen is folded, adapted to extend parallel to and alongside one another, and each set is adapted to extend parallel to and alongside the other set. The primary frame section is narrow compared to the widths of the secondary frame sections and may, when each set of secondary frame sections is formed of two sections, have a width approximately equal to the combined thicknesses of two of the secondary frame sections. As a result a screen ten feet wide and four feet high when extended may, when folded, take up a space approximately four feet by thirty inches by ten inches and yet the reflective sheet will be maintained in straight condition over the bulk of its area and will only be very gradually curved elsewhere.

To the accomplishment of the above, and to such other objects as may hereinafter appear, the present invention relates to the construction of a multi-section folding projection screen as defined in the appended claims and as described in this specification, taken together with the accompanying drawings in which:

Figure 1:
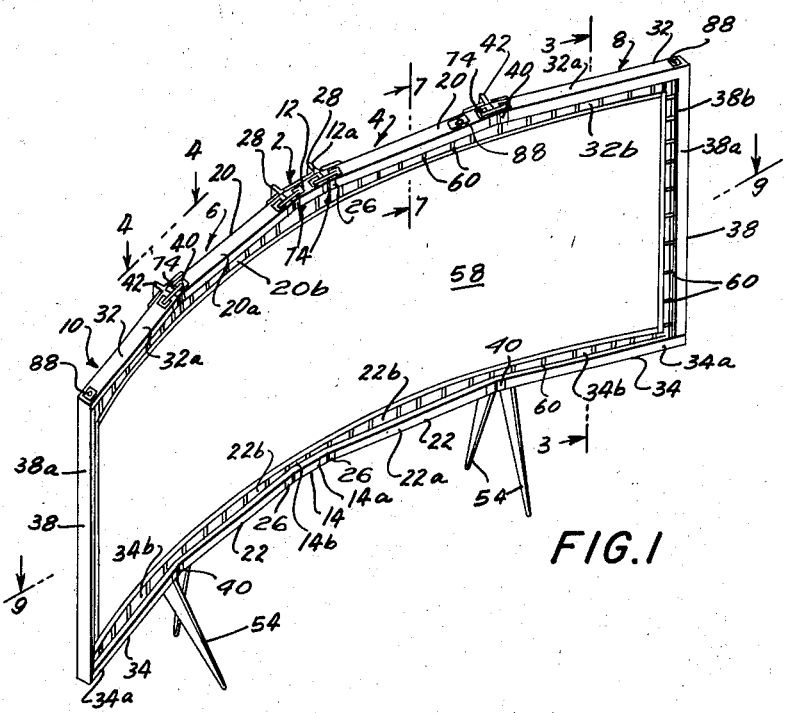
Fig. 1 is a three-quarter perspective view of a first embodiment of the present invention, the screen being shown in unfolded or extended position.

The embodiment of Figs. 1–10 discloses a projection screen made according to the present invention and formed of wood or similar structural material. The framework of the screen comprises a primary frame section 2 with first secondary frame sections 4 and 6 articulately secured to the sides thereof, second secondary frame sections 8 and 10 being articulately secured to the outer sides of the frame sections 4 and 6 respectively.

The primary frame section 2 comprises a top rail 12 and a bottom rail 14 connected by a back wall 16. The top rail 12 may be formed of outer and inner parts 12a and 12b, the outer part 12a extending out beyond the inner part 12b. The bottom rail 14 may correspondingly be formed of outer and inner parts 14a and 14b respectively, the outer part 14a extending out beyond the inner part 14b. Reinforcing strips 17 may be provided on the rear surface of the primary frame section 2, and a carrying handle 18 may be attached thereto.

The secondary frame sections 4 and 6 may be constructed similarly to the primary frame section 2. Their upper and lower rails 20 and 22 respectively may be defined by outer and inner parts 20a, 20b and 22a and 22b respectively, connected by rear walls 24. They are articulately secured to the primary frame section 2 by means of hinges 26 provided on the front faces of the rails 12, 14, 20 and 22 respectively. Flexible protective strips 28 may be provided at the rear surface of the framework covering the spaces between the frame sections, those strips 28 being secured to the frame sections 4 and 6 by means of molding strips 30 and being secured to the frame section 2 by the reinforcing strip 17.

The frame sections 8 and 10 are similar to the frame sections 4 and 6, and have top and bottom rails 32 and 34 respectively each defined by outer and inner parts 32a, 32b and 34a, 34b respectively, connected by rear walls 36. In addition they are provided with outer side rails 38, these rails also being defined by outer and inner parts 38a and 38b respectively. The frame sections 8 and 10 are secured to the outer sides of the frame sections 4 and 6 respectively by means of hinges 40 on the front faces thereof. Flexible protective strips 42 bridge the gaps on the rear surfaces between the frame sections 4 and 8 and the frame sections 6 and 10 respectively, being secured to their respective frame sections by means of molding strips 44.

A pair of leg mounting brackets 46 are secured on the lower surface of the bottom rail 34 of each of the frame sections 8 and 10 by means of screws 48. Each of these brackets 46 has an inclined face 50 provided with an internally threaded aperture 52. The brackets 46 are mounted so that their faces 50 face in opposite directions. Legs 54 are provided at their upper ends with projecting screws 56 adapted to be threadedly received within the apertures 52. Four such legs 54 are provided, two for the mounting brackets 46 on the frame section 8 and two for the mounting brackets 46 on the frame section 10. When these legs 54 are secured to their respective brackets each of the legs of each pair will extend in angularly opposite directions relative to the height of the screen, as clearly shown in Fig. 1.

The projection screen proper is in the form of a flexible sheet 58 having an appropriate reflective surface. That sheet is secured to the top and bottom rails 12, 20, 32 and 14, 22, 34 respectively, by means of flexible elastic strips 60. The outer ends of those strips 60 are fastened by any appropriate means, such as the staples 62, to the rail parts 12b, 14b, 20b, 22b, 32b and 34b respectively, and their inner ends are secured by any appropriate means, such as the stitching 64, to the sheet 58, the attachment being such that the sheet 58 is held substantially taut between the upper and lower rails of the frame sections. In a similar manner the ends of the sheet 58 are secured to the inner parts 38b of the end rails 38 of the frame sections 8 and 10, the attachment being such that when the frame is unfolded to the position shown in Fig. 1, the sheet 58 is held taut in a longitudinal direction.

The attaching strips 60 are spaced along the length and height of the sheet 58 and correspondingly along the length and height of the top, bottom and side rails of the frame. It is to be particularly noted that those of the strips 60 nearest the side edges of the various frame sections 2—10 are spaced inwardly from those side edges by an appreciable distance, say between one and three inches.

Means must be provided for retaining the frame sections in their various positions. To this end each of the frame sections 4 and 6 are provided, adjacent the frame section 2, with vertical recesses 66 covered by plates 68 each having an aperture 70 therein. Received within each recess 66 is the shank 72 of a hook shaped securing member generally designated 74, the lower end of the shank 72 being provided with a washer 76 and a spring 78 being compressed between the plate 68 and the washer 76. The arm 80 of the securing member 74 extends parallel to the top surface of the rail part 20 and beyond the side thereof, and is provided with a downturned nose 82. The top rail 12 of the frame section 2 is provided, adjacent each of its side edges, with a recess 84 covered by a plate 86 with an aperture 88 therein, the recesses 84 being so located that when the frame sections 2, 4 and 6 are unfolded the noses 82 and the securing members 74 on the frame sections 4 and 6 respectively are adapted to be received therein.

Similar securing members 74 are mounted in a similar manner on the top rail 32 of the frame section 10 adjacent the frame section 6 and on the top rail 20 of the frame section 4 adjacent the frame section 8, the frame sections 6 and 8 being provided with recesses 84 on their top rails 20 and 32 respectively into which the noses 82 of the securing members 74 carried by the frame sections 10 and 4 respectively are adapted to be received when the frame sections 8 and 10 are folded out. Thus, as may be seen from Fig. 1, these four securing members 74, one carried by the frame section 4, two by the frame section 6 and one by the frame section 8 will, by engaging with the cooperating recesses in the frame sections 2, 6 and 8 respectively, retain all of the frame sections in their position shown in Fig. 1.

Figure 4:
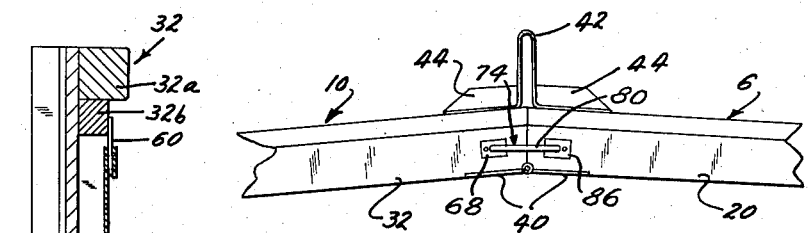
Fig. 4 is a fragmentary top plan view of a portion of the screen of Fig. 1 taken along the line 4—4 thereof.
Figure 5:
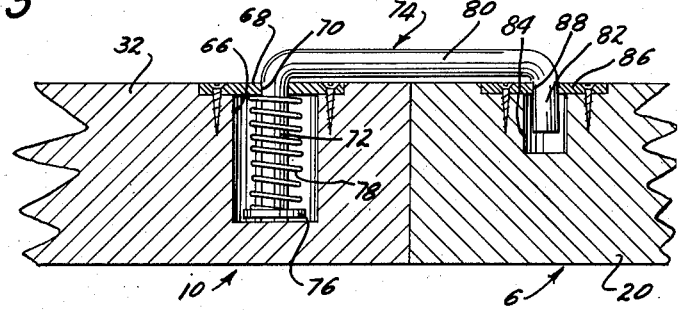
Fig. 5 is a fragmentary vertical cross sectional view of the screen of Fig. 4 showing the construction and mode of operation of one of the frame section securing devices.
Figure 6:
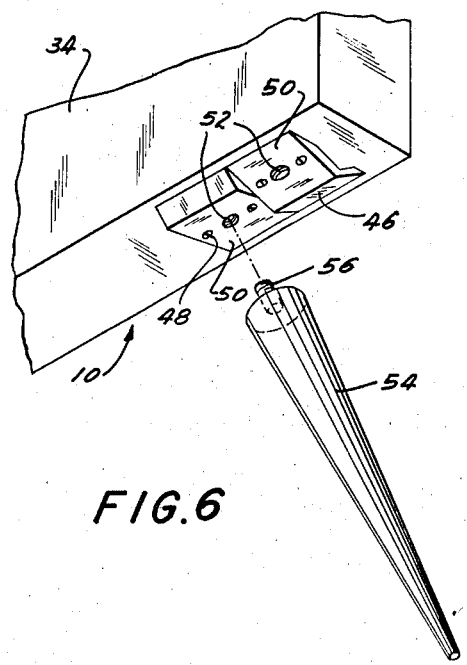
Fig. 6 is a fragmentary bottom perspective view showing the manner in which legs are adapted to be secured to the screen.
Figure 7:
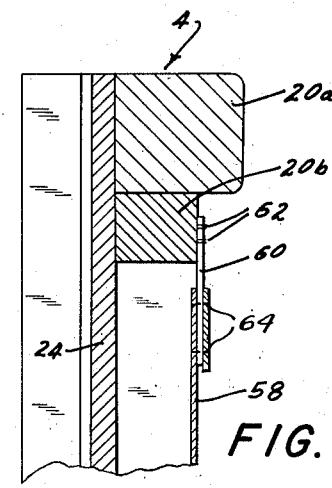
Fig. 7 is a cross sectional view taken along the line 7—7 of Fig. 1.
Figure 8:
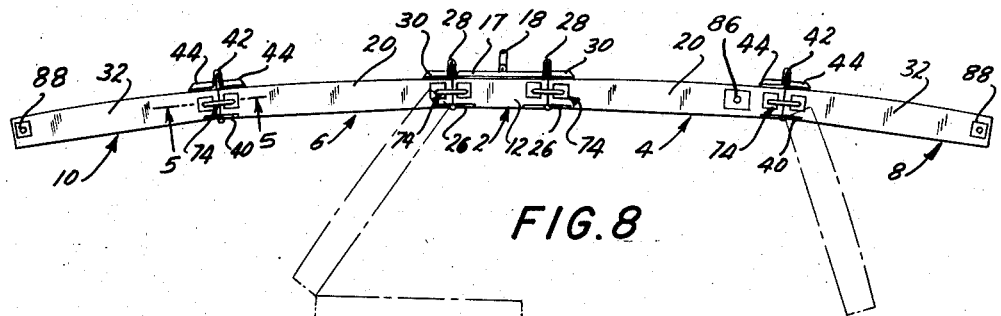
Fig. 8 is a top plan view of the screen of Fig. 1, certain intermediate positions of the secondary frame sections being shown in phantom.
Figure 9:
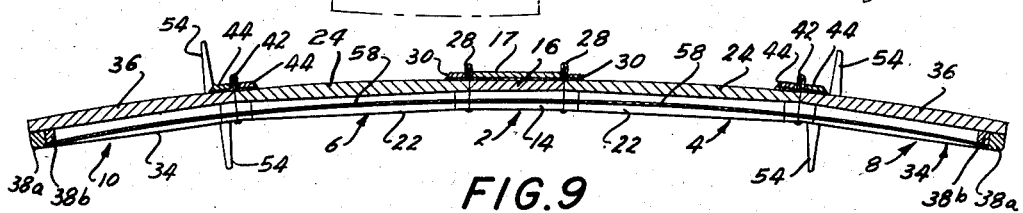
Fig. 9 is a cross sectional view taken along the line 9—9 of Fig. 1.

Making reference to Figs. 1, 8 and 9, and particularly of Fig. 4, it will be noted that the side edges of the top rails of the frame sections 2—10 are not at right angles to the front and rear surfaces thereof. As a result, when the frame sections are folded out to the position shown, with those side edges abutting or substantially so, each pair of adjacent sections will make a fairly large obtuse angle with one another, say on the order of 170 degrees. Hence when the frame sections are unfolded, and because the sheet 68 is secured to those frame sections by means of the flexible strips 60, the sheet 58 will assume the smoothly curved condition clearly visible in Fig. 1.

When the screen is to be collapsed the various securing members 74 will be lifted against the action of the springs 78 until their noses 82 escape from the recesses 84. The frame sections are then folded as follows: The frame sections 8 and 10 are folded as to extend along the inside of the frame sections 4 and 6 respectively, after which the frame sections 4 and 6 are folded so as to extend substantially at right angles to the frame section 2. This brings the sections into the relative positions shown in Fig. 2, in which each set of secondary frame sections 4, 8 and 6, 10 respectively lie alongside one another with the frame sections 8 and 10 substantially abutting along their rear surfaces.

Figure 2:
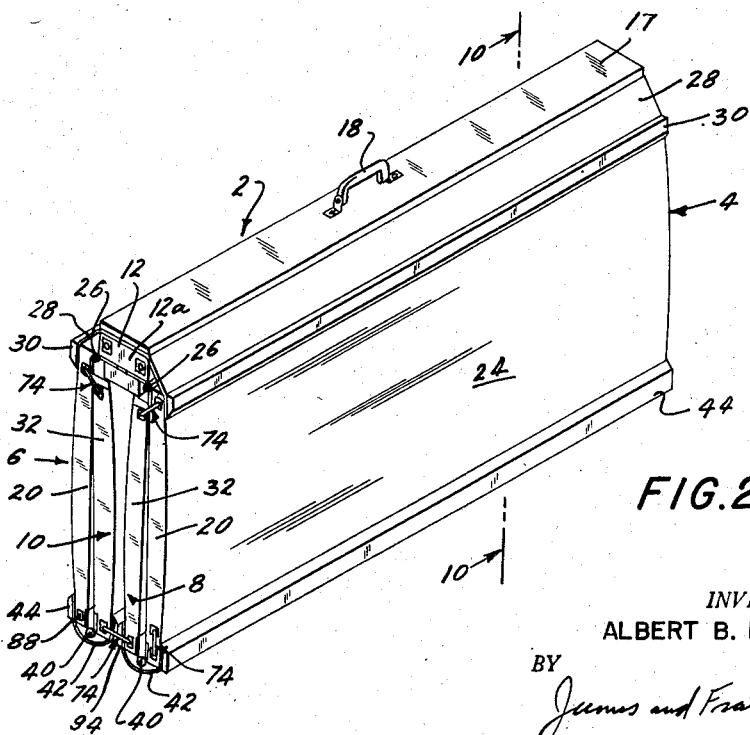
Fig. 2 is a three-quarter perspective view of the screen of Fig. 1 in folded or storage position.
Figure 3:
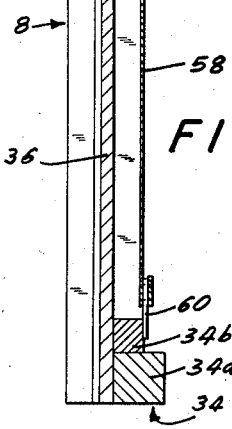
Fig. 3 is a cross sectional view taken along the line 3—3 of Fig. 1.

When the frame sections are in the position shown in Fig. 2, the securing members 74 carried by the frame sections 4 and 6 are rotated so that their noses may be passed through apertures 88 in plates 86 carried by the top rails 32 of the frame sections 8 and 10 adjacent their extremities, in this way holding the frame sections 8 and 10 in folded condition against the sections 4 and 6 respectively. At the same time the securing member 74 carried by the frame section 10 is engageable within the recess 84 in the side rail 32 of the frame section 8 adjacent the frame section 4, thus retaining the two sets of secondary frame sections in their position shown. The top rail 20a of the frame section 4 may be provided with a second recess 84 positioned inwardly from its recess 66 adjacent its outer end for housing the tip 82 of the securing member 74 carried by the frame section 4 at its outer end.

Figure 10:
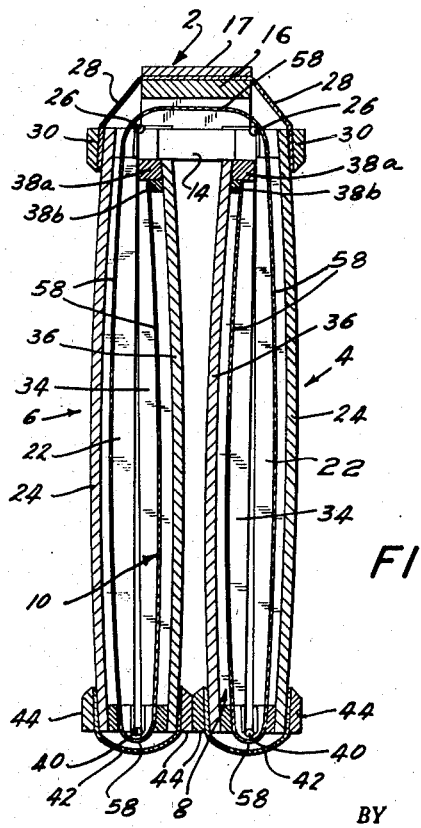
Fig. 10 is a cross sectional view taken along the line 10—10 of Fig. 2.
Figure 11:
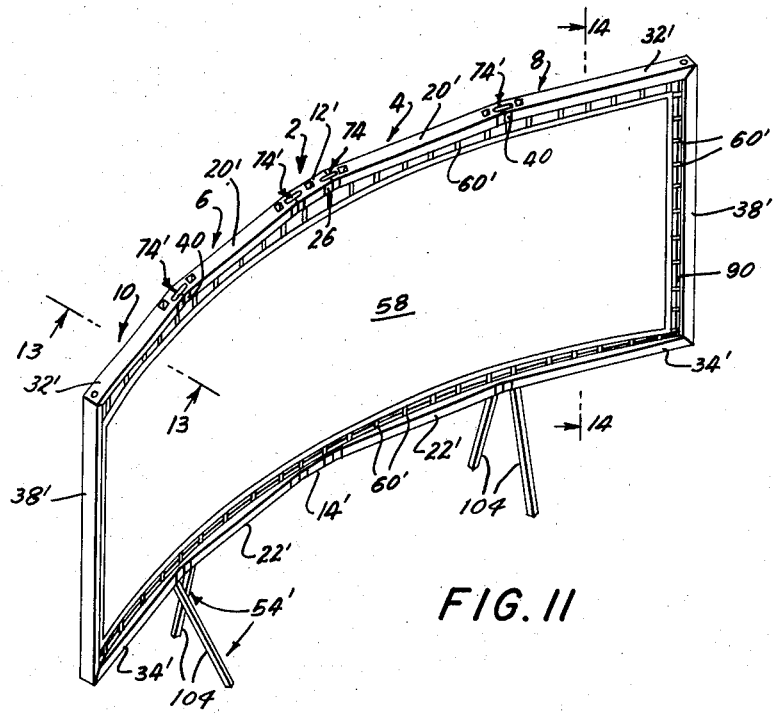
Fig. 11 is a view similar to Fig. 1 but of another embodiment of the present invention.
Figure 12:
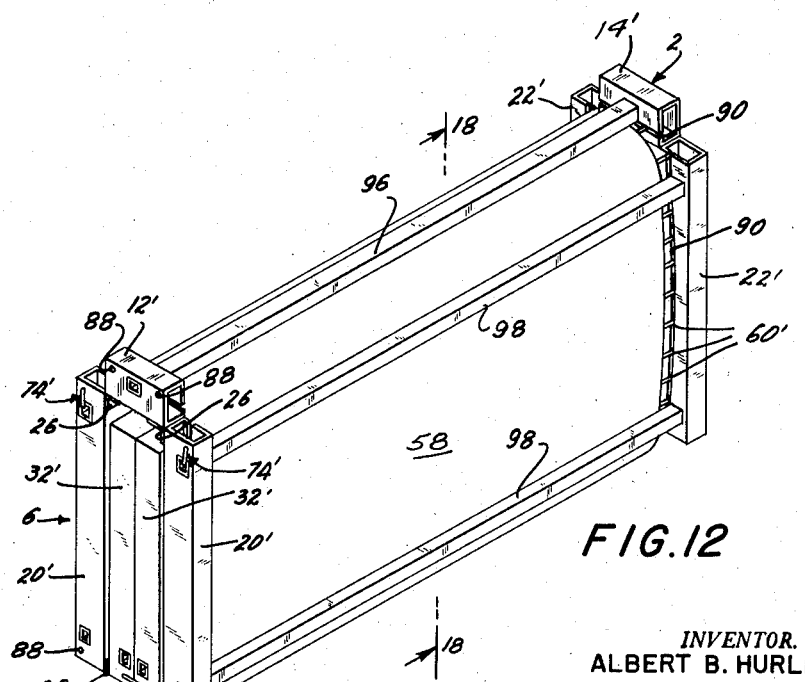
Fig. 12 is a view similar to Fig. 2 but of the embodiment of Fig. 1.
Figure 14:
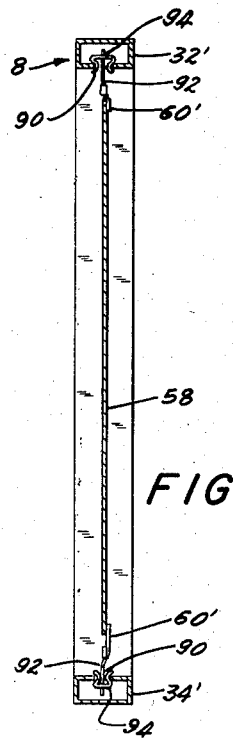
Fig. 14 is a cross sectional view taken along the line 14—14 of Fig. 11.
Figure 13:
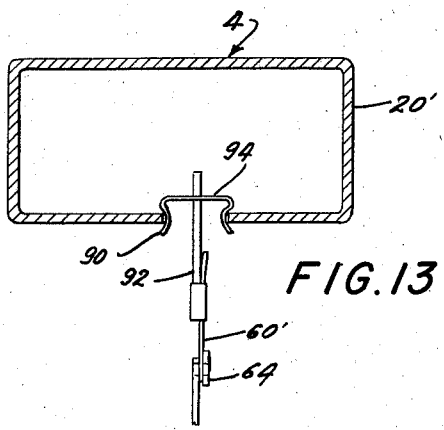
Fig. 13 is a cross sectional view taken along the line 13—13 of Fig. 11.
Figure 15:
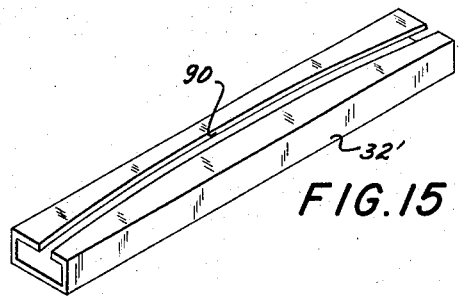
Fig. 15 is a fragmentary perspective view of one of the top or bottom rails of a frame section of the embodiment of Fig. 11.
Figure 16:
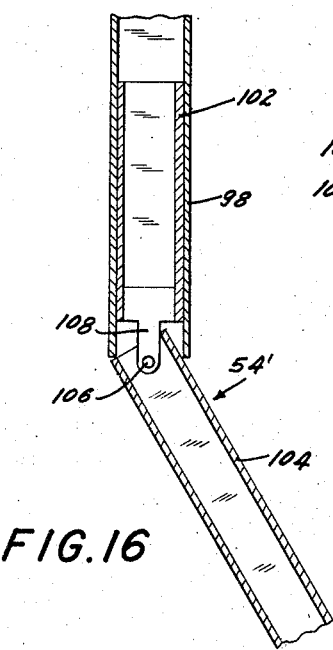
Fig. 16 is a cross sectional view through one of the side structural members of a frame section showing a leg in extended operative position.

Because of the manner in which the sheet 58 is mounted on the top and bottom rails of the respective frame sections that sheet will, when the screen is folded, bend at the joints of the screen only in a very gradual manner, as may best be seen from Fig. 10. This is particularly the case because the securing strips 60 closest to the sides of the various frame sections are appreciably spaced from those sides and because there is an appreciable spacing between the strips. It will further be noted from Figs. 2 and 10 that when the screen is folded the protective strips 28 and 42 at the joints continue to cover and protect the rear surface of the reflective sheet 58.

It will be noted that the width of the primary frame section 2 is much less than the width of any of the other frame sections, and that the width of the secondary frame sections 8 and 10 is slightly less than the width of the frame sections 4 and 6. The width of the primary frame section 2 is preferably not appreciably greater than that required to permit the folding of the frame sections to their disclosed positions, and therefore is approximately equal to the combined thicknesses of the frame sections 8 and 10. Purely by way of example, if the screen of Fig. 1 has an approximate height of four feet and a width of ten feet, the primary frame section 2 would be about four inches wide, secondary frame sections 4 and 6 would be about thirty inches wide, and secondary frame sections 8 and 10 would be about twenty-eight inches wide.

The embodiment of Figs. 11–18 is in general arrangement essentially similar to that of the embodiment just desecribed, since it comprises a primary frame section 2 and secondary frame sections 4—10 within which a reflective sheet 58 is mounted, the frame sections being movable between open and closed positions in the manner previously described with respect to the embodiment of Figs. 1–10. However, in this second disclosed embodiment the frame sections 2—10 are formed of metal tubing such as aluminum extrusions. The top rails 12', 20' and 32', the bottom rails 14', 22' and 34', and the side rails 38' of the outer frame sections 8 and 10 are defined by hollow extrusions on the inner surface of which a groove 90 is formed. The reflective sheet 58 is secured along its top, bottom and side surfaces to the appropriate frame sections by means of connecting strips 60' secured to the sheet 58 by means of stitching 64 or in any other appropriate manner and secured at its other end to a buckle 92, the upper end of that buckle being fastened to a clip 94 receivable within and slidable along the groove 90. In the form here specifically disclosed, and as may best be seen in Fig. 15, the groove 90 in the top and bottom rails of the frame sections may be curved, the grooves 90 in the respective top and bottom rails constituting a smooth continuation of, and registering at their ends with, the grooves 90 in the adjacent top and bottom rails respectively. Hence, even though the top and bottom rails may be straight, it will be apparent that the reflective sheet 58 will be maintained in a smoothly curved condition when the screen is unfolded. The strips 60' are specifically shown as flexible but not resiliently extensible, but such non-elastic strips could be utilized in the embodiment of Figs. 1–10, or the elastic strip 60 of the embodiment of Figs. 1–6 could be used in the embodiment of Figs. 11–18.

The top and bottom rails 12' and 14' of the primary frame section 2 may be secured together by a single rigid rod 96. The top and bottom rails 20' and 22' of the frame sections 4 and 6 may be secured together by means of rods 98 adjacent each side thereof. The outer sides of the top and bottom rails 32' and 34' of the frame sections 8 and 10 are secured together by the end rails 38'. The inner ends of those top and bottom rails 32', 34' may be secured together by means of rods 100. The rod 96 on the primary frame section 2 may function as a carrying handle for the screen when in folded condition.

The securing devices 74' in the embodiment of Figs. 11–18 are essentially similarly arranged to those of the preceding embodiment. However, because the top and bottom rails when formed of aluminum extrusions may be somewhat wider than the corresponding rails of the preceding embodiment, it may not be possible to utilize the securing members 74' at the inner ends of the frame sections 4 and 6 to engage the outer ends of the frame sections 8 and 10. However, the securing device 74' carried by the frame section 10 will engage with cooperating structure on the frame section 8 when the frame sections are folded in order to retain the screen in folded condition. The open ends of the bars 98 may be utilized for housing the tips of the unused securing devices 74' when the screen is folded.

Figure 17:
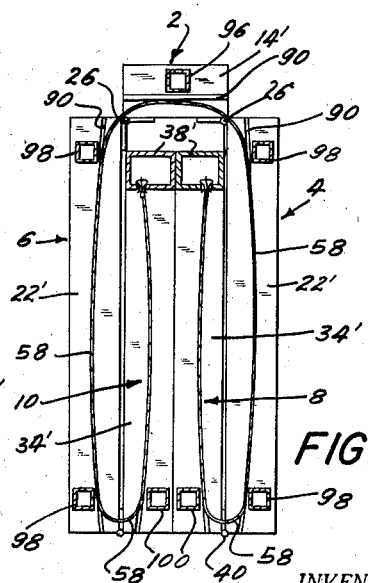
Fig. 17 is a view similar to Fig. 16 but showing the leg in retracted inoperative position.
Figure 18:
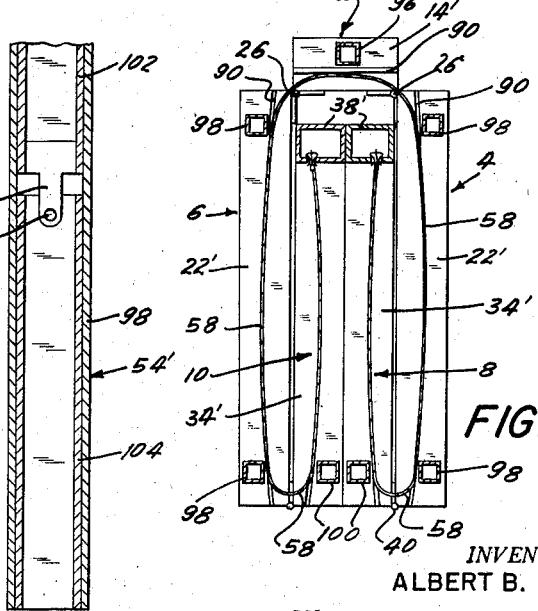
Fig. 18 is a cross sectional view taken along the line 18—18 of Fig. 12.

The legs 54' in the embodiment of Figs. 11–18 are adapted to be housed within the vertical bars 98 and 100 adjacent to the meeting sides of the frame sections 4 and 8 and 6 and 10 respectively. As may best be seen from Figs. 16 and 17 each leg 54' comprises an upper section 102 and a lower section 104 pivotally secured at 106 to ears 108 depending from the upper section 102. Fig. 17 shows a leg 54' completely telescoped within one of the vertical rods 98. When the leg 54' is to be moved to operative screen-supporting position it is telescoped out through the open lower end of the bar 98 until its lower part 104 has completely escaped therefrom. That lower part 104 is then pivoted to its position shown in Fig. 16, the degree of such pivotal movement being limited by engagement between one of the walls of the lower leg part 104 and the ears 108. The upper leg part 102 is then telescoped back into the rod 98 until the bottom edge of the rod 98 engages with the top edge of the inclined lower leg section 104. This serves to lock the lower leg part 104 in screen-supporting position until such time as the screen is lifted and the upper leg portion 102 is again moved down toward the open bottom of the rod 98. Hence the weight of the screen itself will serve to retain the legs 54' in operative position once they have been thus placed, but when the screen is to be stored the legs 54' telescope into the screen structure and take up no additional space.

In the embodiment of Figs. 11–18, as in the preceding embodiment, the manner in which the reflective sheet 58 is secured to the top and bottom rails of the frame sections ensures that the sheet will be gently bent, with a comparatively large radius of curvature, at the joints of the screen structure when the latter is folded up, and hence no creases or foldlines will be produced.

It will be seen that the structure above described is particularly well adapted for the production of portable screens the width of which is greatly in excess of their height, that it facilitates the extension of a screen in a curved configuration independently of the configuration of the frame sections themselves, that it permits comparatively large screens to be stored in a very small space and to be readily portable, and that it permits the use of screens with silvered or other delicate reflective surfaces without any danger that those surfaces will become marred or otherwise distorted even though the screens may be stored for long periods of time.

While but a limited number of embodiments of the present invention have been here disclosed, it will be apparent that many variations may be made in the specific details thereof, all within the spirit of the invention as defined in the following claims.

I claim:

1. A multi-section folding projection screen comprising a comparatively narrow substantially rigid primary frame section having top and bottom rails, comparatively wide substantially rigid secondary frame sections articulately secured to the sides of said primary frame section and movable between closed positions substantially at right angles to said primary frame section and open positions making a large obtuse angle less than 180 degrees with said primary frame section, said secondary frame sections having top and bottom rails, means for releasably securing said secondary frame sections in their open and closed positions respectively, and a flexible reflective sheet secured to the top and bottom rails of said frame sections by means of flexible securing elements, whereby, when said sections are opened, said sheet is held in extended smoothly curved condition, and when said sections are closed said screen takes up a small space.

2. The folding projection screen of claim 1, in which said secondary frame sections comprise a hollow side structural element, legs for said screen being telescopable within said elements to retracted position and beyond said elements to operative position, said legs comprising upper parts always received within said elements and lower parts articulately mounted on said upper parts so as to be movable between positions parallel and angular thereto, said lower parts being movable out of said elements and, when in said angular position, projecting beyond and engaging the lower end of said elements, thereby preventing movement of said legs to retracted position while said lower parts are in said angular position.

3. A multi-section folding projection screen comprising a comparatively narrow substantially rigid primary frame section having top and bottom rails, comparatively wide substantially rigid secondary frame sections articulately secured to the sides of said primary frame section and movable between closed positions substantially at right angles to said primary frame section and open positions making a large obtuse angle less than 180 degrees with said primary frame section, said secondary frame sections having top and botttom rails, means for releasably securing said secondary frame sections in their open and closed positions respectively, and a flexible reflective sheet secured to said top and bottom rails of said frame sections at spaced points along its length by means of flexible securing elements, those of said points nearest the sides of said frame sections being appreciably spaced from said sides, whereby when said sections are opened, said sheet is held in extended smoothly curved condition, and when said sections are closed said screen takes up a small space and said sheet has a comparatively large radius of curvature between said frame sections.

4. A multi-section folding projection screen comprising a comparatively narrow substantially rigid primary frame section having top and bottom rails, two sets of comparatively wide substantially rigid secondary frame sections, each such set comprising a first secondary frame section articulately secured at one side thereof to a side of said primary frame section and a second secondary frame section articulately secured to the other side of said first secondary frame section, said first secondary frame sections being movable between closed positions substantially at right angles to said primary frame section and open positions extending in the same general direction as the width of said primary frame section, said second secondary frame sections being movable between closed positions substantially parallel to and alongside said first secondary frame sections and open positions extending in the same general direction as the width of said first secondary frame sections, said two sets of secondary frame sections when in closed position being substantially parallel to and alongside one another, means for releasably securing said secondary frame sections in their open and closed positions respectively, and a flexible reflective sheet secured to the top and bottom rails of said frame sections, whereby, when said sections are opened, said sheet is held in extended condition, and when said sections are closed said screen takes up a small space.

5. The folding projection screen of claim 4, in which said secondary frame sections comprise a hollow side structural element, legs for said screen being telescopable within said elements to retracted position and beyond said elements to operative position, said legs comprising upper parts always received within said elements and lower parts articulately mounted on said upper parts so as to be movable between positions parallel and angular thereto, said lower parts being movable out of said elements and, when in said angular position, projecting beyond and engaging the lower end of said elements, thereby preventing movement of said legs to retracted position while said lower parts are in said angular position.

6. The folding projection screen of claim 4, in which the width of said primary frame section is substantially equal to the combined thicknesses of said secondary frame sections.

7. The folding projection screen of claim 4, in which said means for releasably securing said sections in open and closed positions respectively comprises a hook carried by one of said primary frame section and the first secondary frame section of one of said sets, and cooperating structure on said second secondary frame section of said set and on the other of said primary frame section and said first secondary frame section of said set, said cooperating structure on said second secondary frame section being in position to be engaged by said hook when said frame sections are closed and said cooperating structure on said other of said primary frame section and said first secondary frame section of said set being in position to be engaged by said hook when said frame sections are open.

8. The folding projection screen of claim 4, in which said means for releasably securing said sections in open and closed positions respectively comprises a hook carried by the first secondary frame section of one of said sets adjacent said primary frame section, cooperating structure on said primary frame section adjacent said first secondary frame section of said set, said cooperating structure being in position to be engaged by said hook when said frame sections are open, and additional cooperating structure on the second secondary frame section of said set at the end thereof remote from said first secondary frame section of said set, said additional cooperating structure being in position to be engaged by said hook when said frame sections are closed.

9. The folding projection screen of claim 4, in which said means for releasably securing said sections in open and closed positions respectively comprises a hook carried by a secondary frame section of one of said sets, cooperating structure on the adjacent end of the other secondary frame section of that set, said cooperating structure being in position to be engaged by said hook when said frame sections are open, and additional cooperating structure on one of said secondary frame sections of the other set, said additional cooperating structure being in position to be engaged by said hook when said frame sections are closed.

10. A multi-section folding projection screen comprising a comparatively narrow substantially rigid primary frame section having top and bottom rails, two sets of comparatively wide substantially rigid secondary frame sections, each such set comprising a first secondary frame section articulately secured at one side thereof to a side of said primary frame section and a second secondary frame section articulately secured to the other side of said first secondary frame section, said first secondary frame sections being movable between closed positions substantially at right angles to said primary frame section and open positions extending in the same general direction as the width of said primary frame section, said second secondary frame sections being movable between closed positions substantially parallel to and alongside said first secondary frame sections and open positions extending in the same general direction as the width of said first secondary frame sections, said two sets of secondary frame sections when in closed position being substantially parallel to and alongside one another, means for releasably securing said secondary frame sections in their open and closed positions respectively, and a flexible reflective sheet secured to said top and bottom rails of said frame sections at spaced points along its length by flexible strips extending between and secured to said sheet and said rails respectively, those of said points nearest the sides of said frame sections being appreciably spaced from said sides, whereby, when said sections are opened, said sheet is held in extended condition, and when said sections are closed said screen takes up a small space and said sheet has a comparatively large radius of curvature between said frame sections.

References Cited in the file of this patent

UNITED STATES PATENTS

| | | |
|---|---|---|
| 1,250,429 | Carroll | Dec. 18, 1917 |
| 1,795,747 | Viken | Mar. 10, 1931 |
| 1,824,460 | Bender | Sept. 22, 1931 |
| 2,279,122 | Kovalchuk | Dec. 10, 1938 |
| 2,430,714 | Geer | Nov. 11, 1947 |
| 2,525,683 | Keely | Oct. 10, 1950 |
| 2,571,382 | Raven | Oct. 16, 1951 |
| 2,744,519 | Means | May 8, 1956 |